(12) United States Patent
Hirai

(10) Patent No.: US 8,964,744 B2
(45) Date of Patent: Feb. 24, 2015

(54) MANAGEMENT APPARATUS, MANAGEMENT METHOD, AND COMPUTER-READABLE MEDIUM

(71) Applicant: Canon Kabushiki Kaisha, Tokyo (JP)

(72) Inventor: Masahito Hirai, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 190 days.

(21) Appl. No.: 13/644,437

(22) Filed: Oct. 4, 2012

(65) Prior Publication Data
US 2013/0107882 A1    May 2, 2013

(30) Foreign Application Priority Data
Oct. 28, 2011    (JP) .................................. 2011-237967

(51) Int. Cl.
H04L 29/06    (2006.01)
H04L 9/32    (2006.01)
H04H 20/00    (2008.01)
H04B 7/14    (2006.01)
H04L 12/18    (2006.01)

(52) U.S. Cl.
CPC ............ H04L 12/18 (2013.01); H04L 63/0428 (2013.01); H04L 63/104 (2013.01)
USPC ........... 370/390; 370/312; 370/315; 713/150; 713/163; 713/168

(58) Field of Classification Search
USPC ........................................................ 370/390
See application file for complete search history.

(56) References Cited

U.S. PATENT DOCUMENTS

| | | | | |
|---|---|---|---|---|
| 6,954,790 | B2* | 10/2005 | Forslow .................... | 709/227 |
| 7,334,125 | B1* | 2/2008 | Pellacuru .................. | 713/163 |
| 7,509,687 | B2* | 3/2009 | Ofek et al. ................ | 709/227 |
| 7,587,591 | B2* | 9/2009 | Lebovitz et al. .......... | 713/163 |
| 7,827,262 | B2* | 11/2010 | Weis ......................... | 709/223 |
| 7,991,836 | B2* | 8/2011 | Weis ......................... | 709/203 |
| 8,429,400 | B2* | 4/2013 | Khalid et al. ............. | 713/163 |
| 2003/0191937 | A1* | 10/2003 | Balissat et al. ........... | 713/163 |
| 2004/0044891 | A1* | 3/2004 | Hanzlik et al. ........... | 713/150 |

(Continued)

FOREIGN PATENT DOCUMENTS

JP    2008-135826 A    6/2008

OTHER PUBLICATIONS

B. Weis et al., "Multicast Extensions to the Security Architecture for the Internet Protocol," IETF Trust, Network Working Group, Request for Comments #5374, downloaded from http://tools.ietf.org/html/rfc5374, pp. 1-38, Nov. 2008.

*Primary Examiner* — Ian N Moore
*Assistant Examiner* — Jenee Williams
(74) *Attorney, Agent, or Firm* — Fitzpatrick, Cella, Harper & Scinto

(57) ABSTRACT

A management apparatus for managing one or a plurality of devices connected to a network, comprises a management unit configured to manage information of each device; an instruction unit configured to cause a server having a function of managing a key to implement multicast using IPsec to register information of the management apparatus and the information of a device caused to belong to a multicast group out of the devices managed by the management unit, and issue key information to be used in the multicast group; and a communication unit configured to perform multicast communication using the IPsec with the device belonging to the multicast group using the key information issued by the server.

10 Claims, 22 Drawing Sheets

(56) References Cited

U.S. PATENT DOCUMENTS

| | | | |
|---|---|---|---|
| 2004/0054899 A1* | 3/2004 | Balfanz et al. | 713/168 |
| 2005/0055579 A1* | 3/2005 | Kanda et al. | 713/150 |
| 2005/0138369 A1* | 6/2005 | Lebovitz et al. | 713/163 |
| 2006/0036733 A1* | 2/2006 | Fujimoto et al. | 709/225 |
| 2006/0070115 A1* | 3/2006 | Yamada et al. | 726/3 |
| 2006/0155981 A1* | 7/2006 | Mizutani et al. | 713/150 |
| 2006/0239218 A1* | 10/2006 | Weis et al. | 370/312 |
| 2007/0016663 A1* | 1/2007 | Weis | 709/223 |
| 2007/0168655 A1* | 7/2007 | Thomasson et al. | 713/163 |
| 2007/0214359 A1* | 9/2007 | Williamson | 713/163 |
| 2007/0286137 A1* | 12/2007 | Narasimhan et al. | 370/338 |
| 2008/0175388 A1 | 7/2008 | Okabe et al. | 380/277 |
| 2008/0307054 A1* | 12/2008 | Kamarthy et al. | 709/206 |
| 2008/0320303 A1* | 12/2008 | Khalid et al. | 713/163 |
| 2009/0150668 A1* | 6/2009 | Liu et al. | 713/163 |
| 2009/0219850 A1* | 9/2009 | Lin et al. | 370/312 |
| 2009/0292917 A1* | 11/2009 | Lebovitz et al. | 713/160 |
| 2010/0122084 A1* | 5/2010 | Liu | 713/163 |
| 2010/0135294 A1* | 6/2010 | Asati et al. | 370/390 |
| 2011/0164752 A1* | 7/2011 | Wainner et al. | 713/150 |
| 2012/0201382 A1* | 8/2012 | Thomasson et al. | 380/255 |
| 2012/0243457 A1* | 9/2012 | Narasimhan et al. | 370/312 |

* cited by examiner

FIG. 4

| DEVICE ID (601) | DEVICE NAME (602) | IP ADDRESS (603) | MAC ADDRESS (604) |
|---|---|---|---|
| 1 | DeviceA | 192.168.1.1 | aa.bb.cc.dd.ee.f1 |
| 2 | DeviceB | 192.168.1.2 | aa.bb.cc.dd.ee.f2 |
| 3 | DeviceC | 192.168.1.3 | aa.bb.cc.dd.ee.f3 |

| GROUP ID (701) | GROUP NAME (702) | PARENT GROUP ID (703) |
|---|---|---|
| 1 | GroupA | 0 |
| 2 | GroupB | 0 |
| 3 | GroupC | 0 |

| GROUP ID | DEVICE ID |
|---|---|
| 1 | 1 |
| 1 | 2 |
| 1 | 3 |
| 2 | 1 |
| 2 | 2 |
| 3 | 1 |
| 3 | 2 |
| 3 | 3 |

801, 802, ~523

| DEVICE NAME | IP ADDRESS | MAC ADDRESS |
|---|---|---|
| DeviceA | 192.168.1.1 | aa.bb.cc.dd.ee.f1 |
| DeviceB | 192.168.1.2 | aa.bb.cc.dd.ee.f2 |
| DeviceC | 192.168.1.3 | aa.bb.cc.dd.ee.f3 |
| DeviceD | 192.168.1.4 | aa.bb.cc.dd.ee.f4 |
| DeviceE | 192.168.1.5 | aa.bb.cc.dd.ee.f5 |
| DeviceF | 192.168.1.6 | aa.bb.cc.dd.ee.f6 |

1101

1102 ADD

| GROUP ID (1201) | MULTICAST ADDRESS (1202) | GROUP KEY (1203) |
|---|---|---|
| 1 | 239.0.0.1 | aaaaa |
| 2 | 239.0.0.2 | bbbbb |
| 3 | 239.0.0.3 | ccccc |
| 4 | 239.0.0.4 | ddddd |
| 5 | 239.0.0.5 | eeeee |

FIG. 12
| FUNCTION NAME | GROUP NAME |
|---|---|
| FUNCTION A | GroupD |
| FUNCTION A | GroupE |
| FUNCTION B | GroupF |
| FUNCTION C | GroupG |
527
1401 1402
FIG. 13A
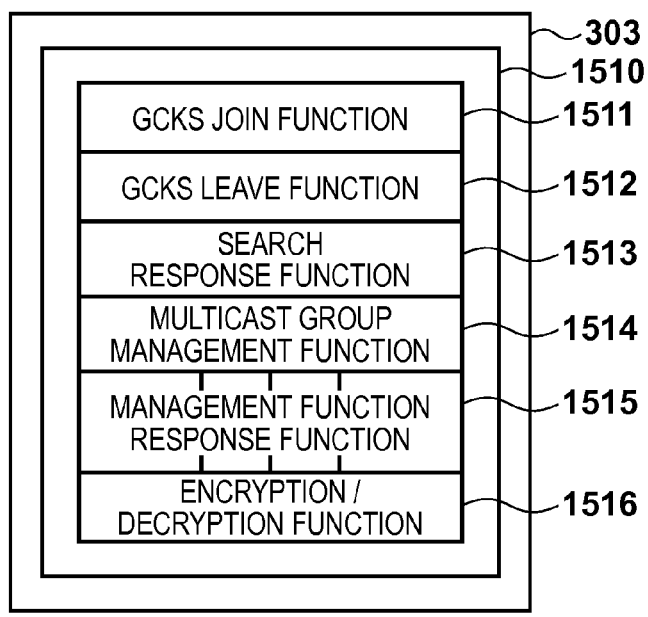
303
1510
1511 GCKS JOIN FUNCTION
1512 GCKS LEAVE FUNCTION
1513 SEARCH RESPONSE FUNCTION
1514 MULTICAST GROUP MANAGEMENT FUNCTION
1515 MANAGEMENT FUNCTION RESPONSE FUNCTION
1516 ENCRYPTION / DECRYPTION FUNCTION
FIG. 13B
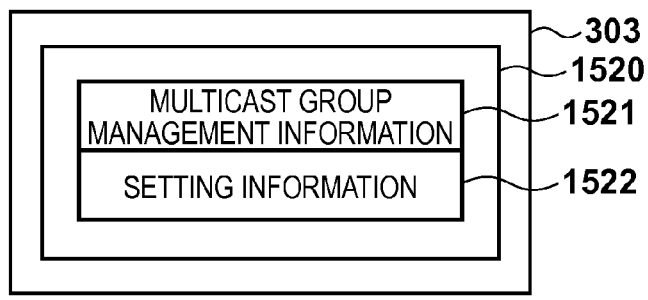
303
1520
1521 MULTICAST GROUP MANAGEMENT INFORMATION
1522 SETTING INFORMATION

FIG. 14
| MULTICAST ADDRESS (1601) | GROUP KEY (1602) |
|---|---|
| 239.0.0.1 | aaaaa |
| 239.0.0.2 | bbbbb |
| 239.0.0.3 | ccccc |
~1521
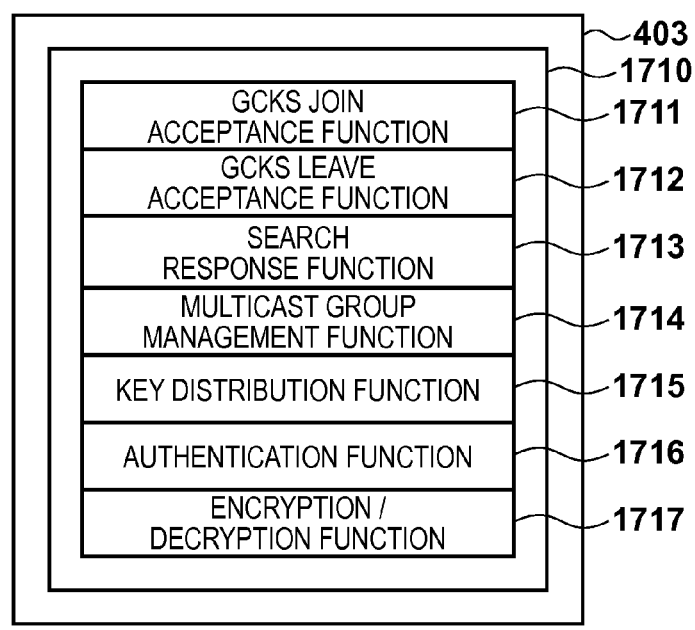
FIG. 15A
- 403
- 1710
- GCKS JOIN ACCEPTANCE FUNCTION — 1711
- GCKS LEAVE ACCEPTANCE FUNCTION — 1712
- SEARCH RESPONSE FUNCTION — 1713
- MULTICAST GROUP MANAGEMENT FUNCTION — 1714
- KEY DISTRIBUTION FUNCTION — 1715
- AUTHENTICATION FUNCTION — 1716
- ENCRYPTION / DECRYPTION FUNCTION — 1717
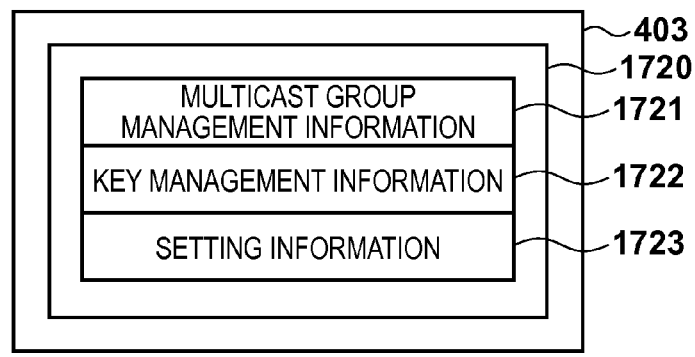
FIG. 15B
- 403
- 1720
- MULTICAST GROUP MANAGEMENT INFORMATION — 1721
- KEY MANAGEMENT INFORMATION — 1722
- SETTING INFORMATION — 1723

FIG. 16

| MULTICAST ADDRESS (1801) | GROUP KEY (1802) |
|---|---|
| 239.0.0.1 | aaaaa |
| 239.0.0.2 | bbbbb |
| 239.0.0.3 | ccccc |
| 239.0.0.4 | ddddd |
| 239.0.0.5 | eeeee |

FIG. 17

| MULTICAST ADDRESS (1901) | DEVICE IDENTIFICATION INFORMATION (1902) |
|---|---|
| 239.0.0.1 | DEVICE MANAGEMENT APPARATUS |
| 239.0.0.1 | DeviceA |
| 239.0.0.1 | DeviceB |
| 239.0.0.2 | DEVICE MANAGEMENT APPARATUS |
| 239.0.0.2 | DeviceC |
| 239.0.0.3 | DEVICE MANAGEMENT APPARATUS |
| 239.0.0.3 | DeviceA |
| 239.0.0.3 | DeviceB |

FIG. 24A

| SELECTION TARGET GROUP | |
|---|---|
| GroupA | |
| GroupB | |
| GroupC | ADD |

2601

| Multicast IPSec ENABLE / DISABLE | EXECUTION TARGET GROUP | |
|---|---|---|
| DISABLE | GroupD | |
| ENABLE | GroupE | |
| ENABLE | GroupF | DELETE |
| | | EXECUTE |

| Multicast IPSec ENABLE / DISABLE | FUNCTION NAME |
|---|---|
| DISABLE | FUNCTION A |
| ENABLE | FUNCTION B |
| ENABLE | FUNCTION C |
| ENABLE | FUNCTION D |
| DISABLE | FUNCTION E |

| DEVICE NAME | IP ADDRESS | MAC ADDRESS |
|---|---|---|
| DeviceA | 192.168.1.1 | aa.bb.cc.dd.ee.f1 |
| DeviceB | 192.168.1.2 | aa.bb.cc.dd.ee.f2 |
| DeviceC | 192.168.1.3 | aa.bb.cc.dd.ee.f3 |

ADD DEVICE

DELETE DEVICE

| Multicast IPSec ENABLE / DISABLE | FUNCTION NAME | GROUP NAME |
|---|---|---|
| DISABLE | FUNCTION A | GroupD |
| ENABLE | FUNCTION A | GroupE |
| ENABLE | FUNCTION B | GroupF |
| ENABLE | FUNCTION C | GroupG |

FIG. 27

| DEVICE ID | MULTICAST IPsec (2901) | HARD IPsec (2902) | SOFT IPsec (2903) | SNMPv3 (2904) |
|---|---|---|---|---|
| 1 | POSSIBLE | IMPOSSIBLE | IMPOSSIBLE | POSSIBLE |
| 2 | POSSIBLE | IMPOSSIBLE | POSSIBLE | POSSIBLE |
| 3 | IMPOSSIBLE | POSSIBLE | POSSIBLE | POSSIBLE |

FIG. 28

| | 3001 |
|---|---|
| HARD IPsec | 1 |
| SOFT IPsec | 2 |
| SNMPv3 | 3 |

MANAGEMENT APPARATUS, MANAGEMENT METHOD, AND COMPUTER-READABLE MEDIUM

BACKGROUND OF THE INVENTION

1. Field of the Invention

The present invention relates to a management apparatus, a management method, and a computer-readable medium and, more particularly, to a method of managing a device such as an image forming apparatus using multicast IPsec.

2. Description of the Related Art

The conventional IPsec standards aim at ensuring reliability between nodes using a secret key, and has specifications difficult to handle in multicast for performing communication among three or more nodes. RFC5374, [online], [searched on Oct. 7, 2011], Internet <URL: http://tools.ietf.org/html/rfc5374> proposes specifications of multicast IPsec for exchanging information on the public key base to make the IPsec usable in multicast.

In the multicast IPsec, a multicast group is registered in a server called a GCKS (Group Controller and Key Server) for performing multicast group management and key management. A device registered in the group can communicate using the multicast IPsec by receiving a key distributed from the GCKS. An example of related art using the multicast IPsec is Japanese Patent Laid-Open No. 2008-135826.

On the other hand, a device management apparatus for managing one or more devices such as image forming apparatuses via a network can generally group management target devices and manage them. A group of management target devices will be referred to as a device group hereinafter. The device management apparatus can execute arbitrary management processing on the device group basis.

The device management apparatus can execute management processing of a plurality of management target devices at once by using the multicast IPsec.

In the apparatus for managing one or more devices such as image forming apparatuses via a network, a contradiction may arise if the device group including one or more devices does not match the multicast group.

For example, assume that the device management apparatus sets management information for a plurality of devices belonging to an arbitrary device group at once. If a device belongs to a multicast group different from that of the device management apparatus, the management information setting using the multicast IPsec cannot be done for the device.

In addition, if a device that is not included in the management targets of the device management apparatus belongs to the same multicast group as that of the management target devices, the setting transferred by the multicast IPsec is distributed to the device as well.

SUMMARY OF THE INVENTION

According to one aspect of the present invention, there is provided a management apparatus for managing one or a plurality of devices connected to a network, comprising: a management unit configured to manage information of each device; an instruction unit configured to cause a server having a function of managing a key to implement multicast using IPsec to register information of the management apparatus and the information of a device caused to belong to a multicast group out of the devices managed by the management unit, and issue key information to be used in the multicast group; and a communication unit configured to perform multicast communication using the IPsec with the device belonging to the multicast group using the key information issued by the server.

According to the present invention, a management apparatus and devices can perform communication by multicast while maintaining security and eliminating mismatch in groups to which the devices belong.

Further features of the present invention will become apparent from the following description of exemplary embodiments (with reference to the attached drawings).

BRIEF DESCRIPTION OF THE DRAWINGS

FIG. 4 is a view showing the data structure of a device table;

FIG. 5 is a view showing the data structure of a group table;

FIG. 6 is a view showing the data structure of a device group correspondence table;

FIG. 12 is a view showing an example of a correspondence table of functions and groups to which devices belong;

FIGS. 13A and 13B are block diagrams showing the software configuration of a device;

FIG. 14 is a view showing an example of the detailed data structure of multicast group management information;

FIGS. 15A and 15B are block diagrams showing the software configuration of a GCKS;

FIG. 16 is a view showing an example of the detailed data structure of key management information of the GCKS;

FIG. 17 is a view showing details of the multicast group management information;

FIGS. 24A and 24B are views showing examples of screens used to select settings of multicast IPsec for each function;

FIG. 25 is a view showing settings of multicast IPsec for each function;

FIG. 27 is a view showing a table that describes the security information of each device;

FIG. 28 is a view showing a priority order table when a device has a plurality of security methods.

DESCRIPTION OF THE EMBODIMENTS

<First Embodiment>
[System Arrangement]

Figure 1:
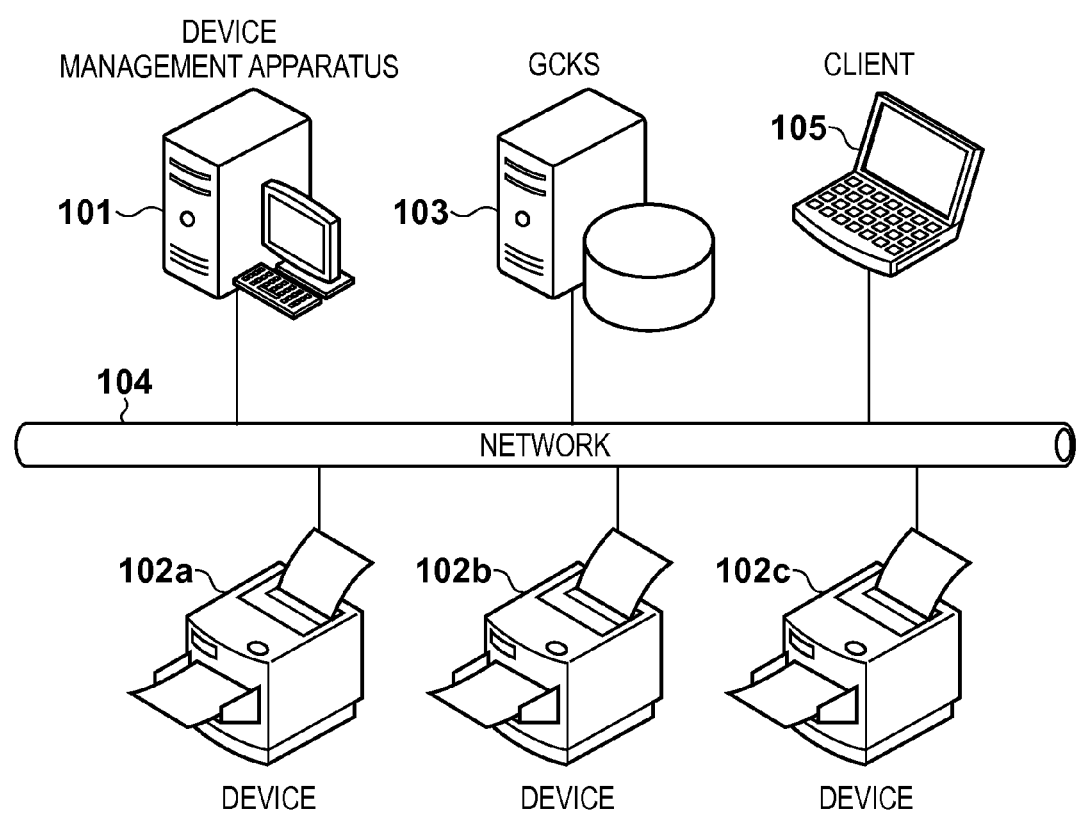
FIG. 1 is a view showing the system arrangement.

The best mode for carrying out the present invention will now be described with reference to the accompanying drawings. FIG. 1 is a view showing a system arrangement according to the present invention. A device management apparatus 101, devices 102 (a, b, and c) such as image forming apparatuses, a GCKS 103, and a client apparatus 105 are connected to a network 104. Note that the number of apparatuses is not limited to the arrangement shown in FIG. 1, and may be increased or decreased as needed.

Figure 2A:
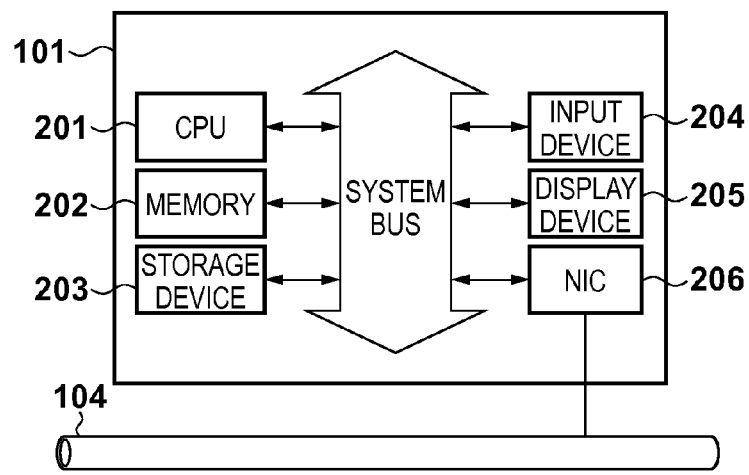
FIGS. 2A, 2B, and 2C are block diagrams showing the hardware arrangements of devices.

FIG. 2A is a block diagram showing the hardware arrangement of the device management apparatus 101 shown in FIG. 1. A program for carrying out the present invention is loaded from a storage device 203 such as a hard disk to a memory 202 and executed by a CPU 201. The device management apparatus 101 communicates, via a network interface (NIC) 206, with the devices 102 and the GCKS 103 connected to the network 104.

The device management apparatus 101 displays a user interface (UI) provided by the program on a display device 205 such as a display, and receives a user input from an input device 204 such as a keyboard. Note that when the program on the device management apparatus 101 is formed as a web application, the user interface generated on the device management apparatus 101 is displayed on the display device of the client apparatus 105 shown in FIG. 1 via the network 104. A user input is received from the input device of the client apparatus 105 and transferred to the device management apparatus 101.

Figure 2B:
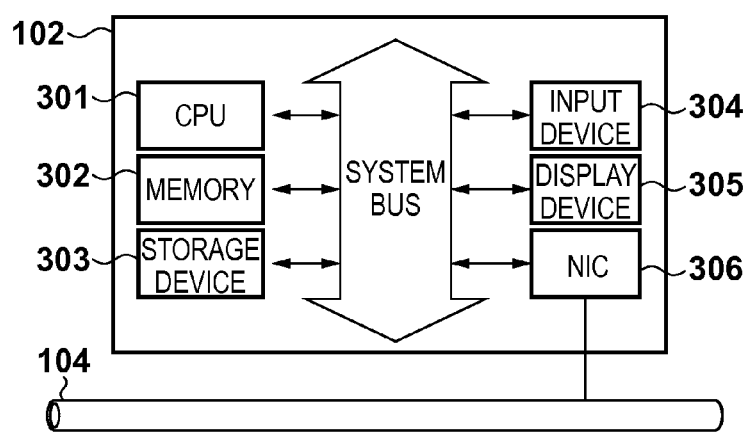

FIG. 2B is a block diagram showing the hardware arrangement of the device 102 shown in FIG. 1. FIG. 1 illustrates three devices all of which have the same arrangement. A CPU 301 loads a program for implementing functions concerning the present invention, which is stored in a storage device 303, to a memory 302 and executes the program. The device 102 communicates, via a NIC 306, with the device management apparatus 101 and the GCKS 103 connected to the network 104.

The device 102 displays the user interface of the program on a display device 305 such as an operation panel, and receives a user input from an input device 304 such as input keys arranged on the operation panel. If the device 102 is a multi function peripheral, it includes constituent elements such as a printer and a scanner (not shown) necessary for the device to function as the multi function peripheral.

Figure 2C:
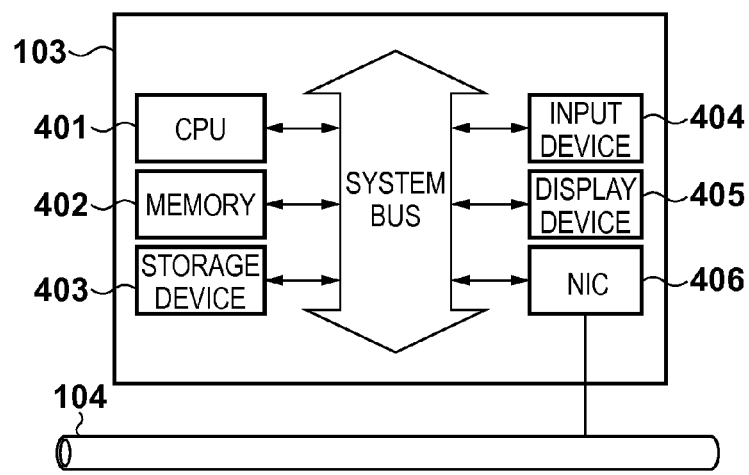

FIG. 2C is a block diagram showing the hardware arrangement of the GCKS 103 shown in FIG. 1. A CPU 401 loads a program for implementing functions concerning the present invention, which is stored in a storage device 403, to a memory 402 and executes the program. The GCKS 103 communicates, via a NIC 406, with the device management apparatus 101 and the devices 102 connected to the network 104.

The GCKS 103 is a server having a GCKS (Group Controller and Key Server) function. The GCKS function of the GCKS 103 performs multicast group management and key management/issuance. The GCKS 103 displays the user interface of the program on a display device 405 such as a display, and receives a user input from an input device 404 such as a keyboard. In this embodiment, the input device 404 and the display device 405 are described as the constituent elements. However, when the GCKS 103 is formed from a device such as a router, these constituent elements are not indispensable. Note that since the client apparatus 105 shown in FIG. 1 is a general client apparatus, and has the same hardware arrangement as in FIG. 2A, a description thereof will be omitted.

[Software Configuration (Device Management Apparatus)]

Figure 3A:
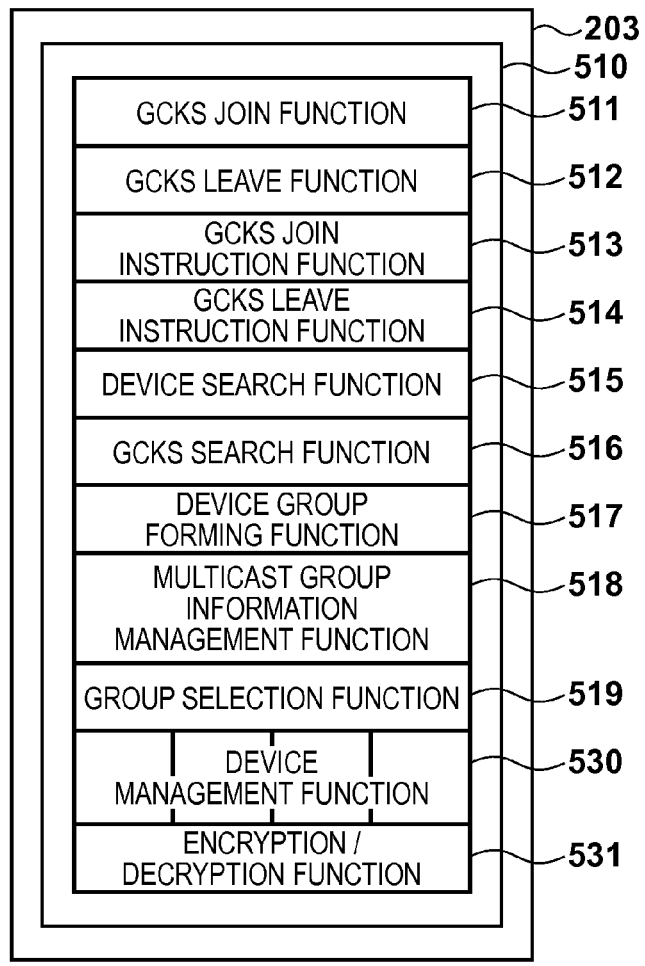
FIGS. 3A and 3B are block diagrams showing the software configuration of a device management apparatus.
Figure 3B:
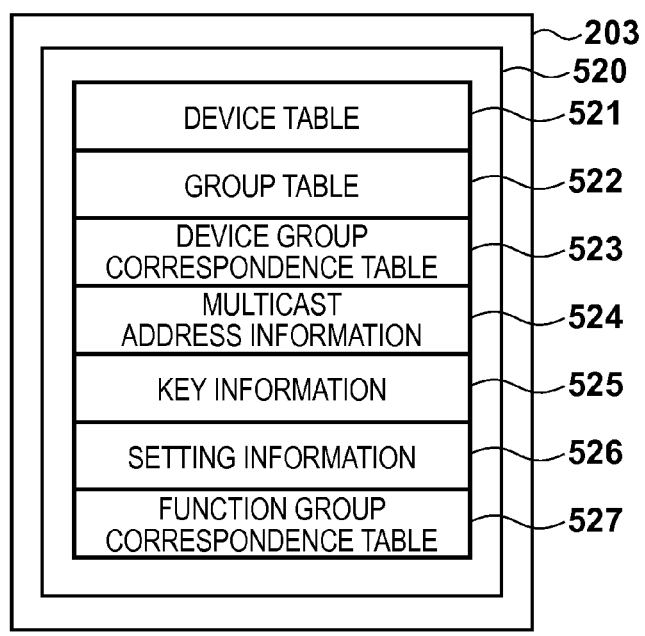

FIGS. 3A and 3B are block diagrams showing the internal configuration of software stored in the storage device 203 of the device management apparatus 101. The storage device 203 stores a program 510, shown in FIG. 3A and data 520 shown in FIG. 3B which are to be used by the program 510. The program 510 has a plurality of functions. The functions will be described below.

The device management apparatus 101 requests the GCKS 103 to make the device management apparatus 101 join the multicast group by a GCKS join function 511. At this time, the device management apparatus 101 attaches authentication information included in setting information 526 shown in FIG. 3B. Upon receiving a join permission notification from the GCKS 103, the device management apparatus 101 receives a group key issued by the GCKS 103, and registers the group key as key information 525. The device management apparatus 101 requests the GCKS 103 to make the device management apparatus 101 leave the multicast group by a GCKS leave function 512. At this time, the device management apparatus 101 attaches authentication information included in the setting information 526. Upon receiving a leave permission notification from the GCKS 103, the device management apparatus 101 deletes the group key from the key information 525 in FIG. 3B.

The device management apparatus 101 instructs the device 102 to join the multicast group by a GCKS join instruction function 513. The device management apparatus 101 instructs the device 102 to leave the multicast group by a GCKS leave instruction function 514.

The device management apparatus 101 searches for the device 102 on the network 104 by a device search function 515, and acquires information necessary for management from the device 102. The device search function 515 searches for the device 102 using a protocol such as SNMP (Simple Network Management Protocol). Information such as the IP address of the device 102 searched by the device search function 515 is stored in a device table 521 shown in FIG. 3B.

The device management apparatus 101 searches for the GCKS 103 on the network 104 by a GCKS search function 516. The GCKS search function 516 searches for the GCKS 103 using a communication method such as a web service. Information such as the IP address of the found GCKS 103 is stored in the setting information 526 in FIG. 3B. The device management apparatus 101 forms a device group by a device group forming function 517 using information of the device table 521 provided in the device management apparatus 101. The device group forming function 517 has a user interface that causes the user to edit the device group. The device group information edited by the user is stored in a group table 522 and a device group correspondence table 523 shown in FIG. 3B.

The device management apparatus 101 associates a device group with a multicast address, and stores them in multicast address information 524 by a multicast group information management function 518. The multicast group information management function 518 also manages the key information 525 shown in FIG. 3B corresponding to the multicast address. The device management apparatus 101 provides a user interface that causes the user to select a device group as a target of the device management function by a group selection function 519.

The device management apparatus 101 has, as a device management function 530, a function of managing one or a plurality of devices. There exist, as the device management function 530, for example, a function of distributing setting information to a device, a function of acquiring the state of a device, a function of distributing firmware to a device, a function of acquiring the setting information of a device, and a function of controlling the power supply state of a device. A function group correspondence table 527 shown in FIG. 3B is looked up every time the device management function 530 is executed.

The device management apparatus 101 encrypts/decrypts data to be transferred to or received from the device 102 by an encryption/decryption function 531. In FIG. 3A, when executing the GCKS join instruction function 513 and the GCKS leave instruction function 514, the device management apparatus 101 needs to communicate with the device 102. However, as the protocol for the communication, an arbitrary protocol defined between the device management apparatus 101 and the device 102 is usable. For example, a web service or the like is usable.

[Structures of Tables]

FIG. 4 is a view showing the detailed data structure of the device table 521 in FIG. 3B. The device table 521 stores, as device information searched by the device search function 515, device information such as a device name 602, an IP address 603, and a MAC address 604 acquired from a device. Each device information in the device table 521 can also be generated by adding, deleting, or editing information of a device using the editing tool of the database or importing a file describing device information without intervening the device search function 515.

A device ID 601 is assigned to each device information stored in the device table 521 as a value to uniquely identify the device information. The device ID 601 need only be a value capable of uniquely identifying device information, and the MAC address 604 or a value generated from the MAC address 604 is also usable.

FIG. 5 is a view showing the detailed data structure of the group table 522 shown in FIG. 3B. The group table 522 includes a group ID 701, a group name 702, and a parent group ID 703. Groups can have a hierarchical structure. In this case, the IP of an upper group is stored as the parent group ID 703. If no parent group exists, a special value such as 0 is stored as the parent group ID.

FIG. 6 is a view showing the detailed data structure of the device group correspondence table 523 shown in FIG. 3B. This table includes a pair of a group ID 801 and a device ID 802 as information representing which device belongs to which group. Any value stored as the group ID 701 in FIG. 5 is stored as the group ID 801 in FIG. 6. Any value stored as the device ID 601 in FIG. 4 is stored as the device ID 802 in FIG. 6.

[UI Screens]

Figure 7:
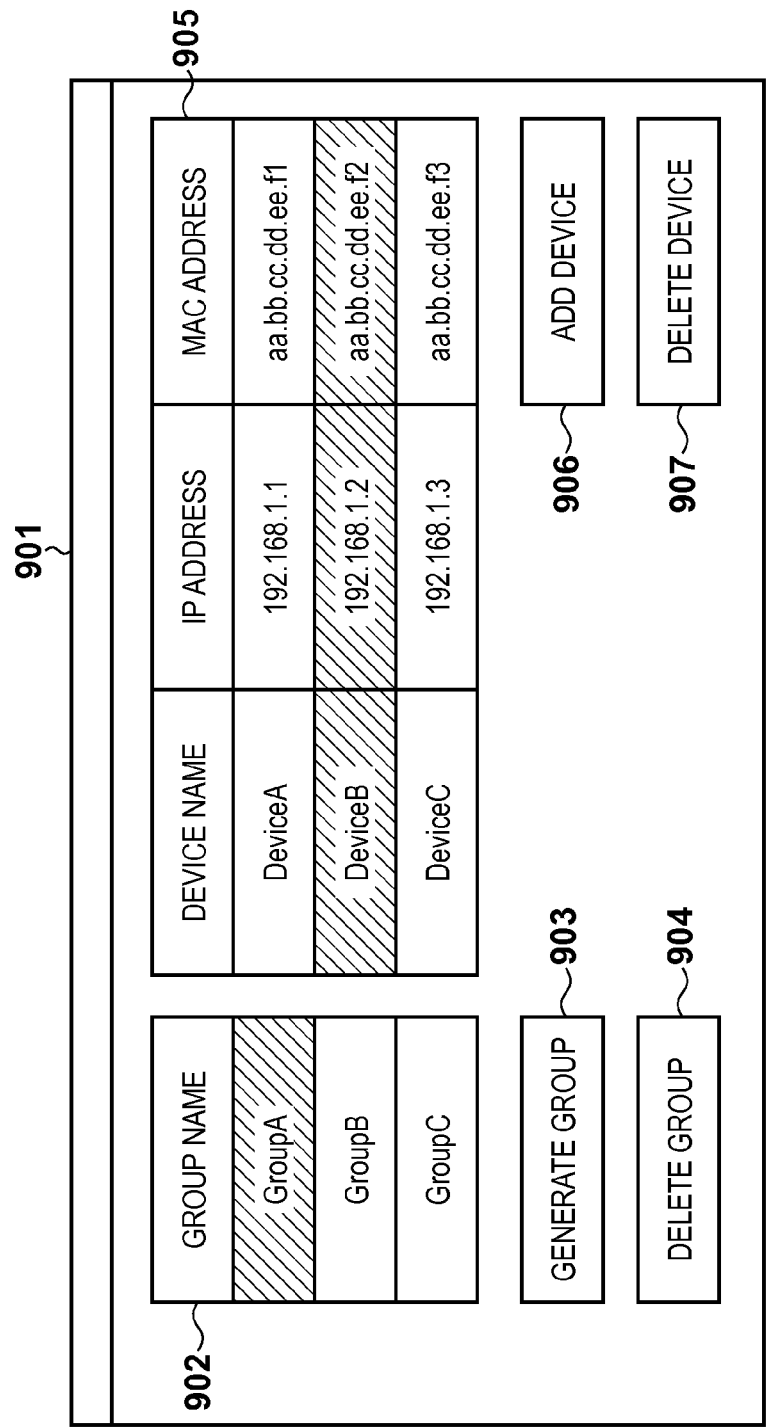
FIG. 7 is a view showing an example of a screen that causes a user to edit a device group.

FIG. 7 illustrates a screen that causes the user to edit a device group by the device group forming function 517. When the user selects a group from a group selection list 902 and presses a group deletion button 904, the information of the selected group is deleted from the group table 522 shown in FIG. 5, and information concerning the corresponding group ID is deleted from the device group correspondence table 523 shown in FIG. 6.

Figures 8, 9:
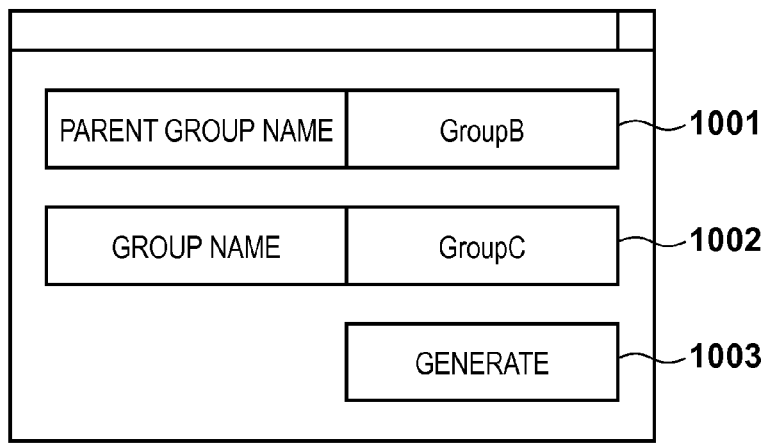
FIG. 8 is a view showing an example of a screen for group generation.
FIG. 9 is a view showing an example of a screen used to add a device to a group.

When the user selects a group from the group selection list 902 and presses a group generation button 903, a group generation screen shown in FIG. 8 is displayed. When the user selects a device group from the group selection list 902, a list of devices belonging to the selected device group is displayed in a device selection list 905. When the user selects a device from the device selection list 905 and presses a device deletion button 907, information corresponding to the selected group and the selected device is deleted from the device group correspondence table 523 shown in FIG. 6. When the user selects a group from the group selection list 902 and presses a device addition button 906, a device addition screen shown in FIG. 9 is displayed.

FIG. 8 illustrates a device group generation screen displayed by pressing the group generation button 903 shown in FIG. 7. The name of a device group selected in the group selection list 902 shown in FIG. 7 is displayed as a parent group name 1001. When the user inputs, to a group name 1002, the name of a device group to be newly generated, and presses a generation button 1003, information about the generated device group is registered in the group table 522 shown in FIG. 5. At this time, a new ID for the generated device group is registered as the group ID 701 in the group table 522 shown in FIG. 5. Similarly, a value input to the group name 1002 in FIG. 8 is registered as the group name 702, and a group ID corresponding to the device group displayed in the parent group name 1001 of FIG. 8 is registered as the parent group ID 703. Note that if the user designates no device group in the group selection list 902 shown in FIG. 7, the parent group name 1001 in FIG. 8 is not displayed, and the generated group is added as the uppermost device group. When the user reselects the device group selected in the list on the screen shown in FIG. 7, the selection is canceled.

FIG. 9 shows a device addition screen displayed by pressing the device addition button 906 shown in FIG. 7. The screen in FIG. 9 displays information acquired from the device table 521 in FIG. 4. When the user selects a device from a device list 1101 and presses an addition button 1102, the correspondence information of the selected device group and device is added to the device group correspondence table 523 shown in FIG. 6.

Figures 10, 11:
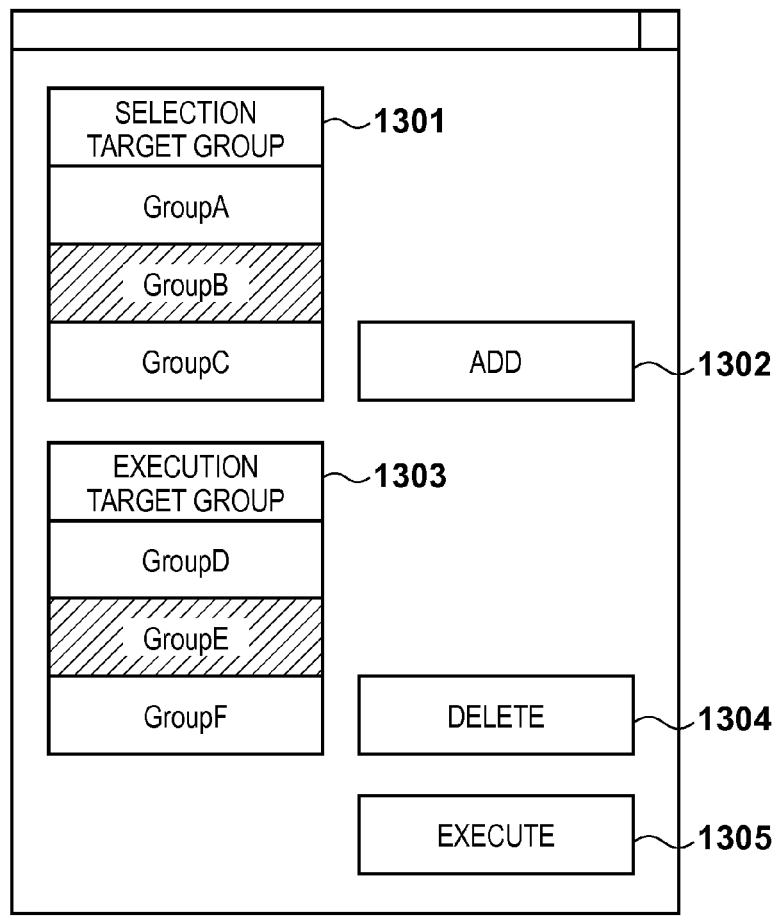
FIG. 10 is a view showing an example of a correspondence table of addresses and secret keys.
FIG. 11 is a view showing an example of a screen used to select a device group.

FIG. 10 is a table showing an example of a method of managing the multicast address information 524 and the key information 525 in FIG. 3B. This table stores the correspondence relationship between a group ID 1201, a multicast address 1202, and a group key 1203. The group ID 1201 stores the ID of each device group. The multicast address 1202 assigned to a device group indicated by the group ID 1201 is a multicast address assigned to the protocol used in the device management function. As the multicast address, an unused address of the multicast addresses is sequentially assigned by the program of this embodiment. The group key 1203 distributed from the GCKS 103 is stored in association with the group ID 1201 and the multicast address 1202.

When the device management apparatus 101 communicates with a device group by multicast IPsec, the group key 1203 corresponding to the device group is used, and the encryption/decryption function 531 encrypts data to be transferred to the device 102. Encrypted information returned from the device 102 is decrypted by the encryption/decryption function 531.

FIG. 11 illustrates a screen that causes the user to select a device group as the device management function execution target. The screen shown FIG. 11 is displayed when executing the functions of device management. A selection target group name list 1301 in FIG. 11 is a list of device groups selectable as a management function execution target. The names of device groups acquired from the group table shown in FIG. 5 are displayed. At this time, the management function execution target is designated on the device group basis.

When the user selects a device group in the selection target group name list 1301 shown in FIG. 11 and presses an addition button 1302, the device group selected in the selection target group name list 1301 is added to an execution target group name list 1303 of the management function execution targets. The device group is deleted from the selection target group name list 1301. When the user presses a deletion button 1304, the device group selected in the execution target group name list 1303 of the function execution targets is deleted from the execution target group name list 1303 and added to the selection target group name list 1301.

The function execution target group list in FIG. 11 is stored as the function group correspondence table 527 in FIG. 12. When the user presses an execution button 1305 in FIG. 11, the function group correspondence table 527 in FIG. 12 is looked up, and the management function is executed for the device 102 belonging to the device group registered as the management function execution target. Note that when executing the management function for the second or subsequent time, the values of the selection target group name list 1301 and the execution target group name list 1303 may be set in accordance with the information of the function group correspondence table 527 shown in FIG. 12 when displaying the screen shown in FIG. 11.

FIG. 12 shows the function group correspondence table 527 that stores information about a device group as a device management function execution target stored in FIG. 11. A function name 1401 representing a function and a group name 1402 of the execution target are registered. When executing the function, information such as a multicast address in FIG. 10 and necessary information are read out from the device group correspondence table 523 in FIG. 6 and the device list in FIG. 4 based on the group name corresponding to the function name 1401. The management function is then executed for the devices belonging to the device group as the execution target.

[Software Configuration (Device)]

FIGS. 13A and 13B are block diagrams showing the configuration of software stored in the storage device 303 of the device 102 associated with the present invention. The storage device 303 stores a program 1510, shown in FIG. 13A and data 1520 shown in FIG. 13B, which are to be used by the program. The program 1510 has a plurality of functions. The functions will be described below.

Upon receiving a multicast group join instruction from the device management apparatus 101, the device 102 requests the GCKS 103 to join a multicast group by a GCKS join function 1511. At this time, the device 102 acquires authentication information from setting information 1522 in FIG. 13B and attaches it.

Upon receiving an instruction to leave the multicast group from the device management apparatus 101, the device 102 requests the GCKS 103 to leave the multicast group by a GCKS leave function 1512. At this time, the device 102 acquires authentication information from the setting information 1522 in FIG. 13B and attaches it. When searched by the device management apparatus 101, the device 102 returns information such as an IP address and a MAC address in the setting information 1522 to the device management apparatus 101 by a search response function 1513 using a protocol such as SNMP.

Based on a multicast registration or leave permission from the GCKS 103, the device 102 registers multicast group information in multicast group management information 1521 by a multicast group management function 1514. The information registered in the multicast group management information 1521 in FIG. 13B includes a group key. In accordance with various kinds of device management functions executed by the device management apparatus 101, the device 102 returns a response by a management function response function 1515 for responding to one or a plurality of device management functions. When each function operates, data is encrypted/decrypted by an encryption/decryption function 1516 using the group key registered in the multicast group management information 1521.

FIG. 14 shows the detailed data structure of the multicast group management information 1521 shown in FIG. 13B. The multicast group management information 1521 holds a multicast address 1601 and a group key 1602. When the device management apparatus 101 uses a multicast address corresponding to a function, a group key corresponding to the multicast address is used to decrypt data received by the multicast address.

[Software Configuration (GCKS)]

FIGS. 15A and 15B are block diagrams showing the configuration of software stored in the storage device 403 of the GCKS 103 associated with the present invention. The storage device 403 stores a program 1710 shown in FIG. 15A and data 1720 shown in FIG. 15B to be used by the program. The program 1710 has a plurality of functions. The functions will be described below.

Upon receiving a multicast group join notification from the device management apparatus 101 or the device 102, the GCKS 103 confirms authentication information received from the device management apparatus 101 or the device 102 by an authentication function 1716. To permit join, the GCKS 103 transfers a join acceptance notification to the device management apparatus 101 or the device 102. At this time, the GCKS 103 also distributes a group key using a key distribution function 1715.

To newly distribute a key, the GCKS 103 registers the key to be distributed in key management information 1722. The GCKS 103 encrypts/decrypts data to be transferred to or received from the device management apparatus 101 or the device 102 by an encryption/decryption function 1717. The GCKS 103 stores the identification information of the device management apparatus 101 and the devices 102 belonging to a multicast group in multicast group management information 1721.

Upon receiving a multicast group leave notification from the device management apparatus 101 or the device 102, the GCKS 103 confirms authentication information received from the device management apparatus 101 or the device 102 by the authentication function 1716. To permit leave, the GCKS 103 transfers a leave acceptance notification to the device management apparatus 101 or the device 102.

When the device 102 has left the multicast group, the GCKS 103 generates and issues a new key for the multicast group. The GCKS 103 distributes the group key to the device management apparatus 101 and the devices 102 belonging to the multicast group using the key distribution function 1715, and registers the newly issued key in the key management information 1722. The GCKS 103 accepts a GCKS search from the device management apparatus 101 by a search response function 1713, and returns, from setting information 1723 of the GCKS, information necessary for using the GCKS. The GCKS 103 manages the multicast group by a multicast group management function 1714.

FIG. 16 is a view showing the detailed data structure of the key management information 1722 of the GCKS 103. The key management information includes a multicast address 1801 and a group key 1802 assigned to each multicast address.

FIG. 17 is a view showing the detailed data structure of the multicast group management information 1721 shown in FIG. 15B. The multicast group management information 1721 includes device identification information 1902 corresponding to the multicast address 1801 in FIG. 16. Identification information for uniquely specifying the device 102 or the device management apparatus 101 belonging to each multicast group is registered.

[Processing Procedure]

Figure 18:
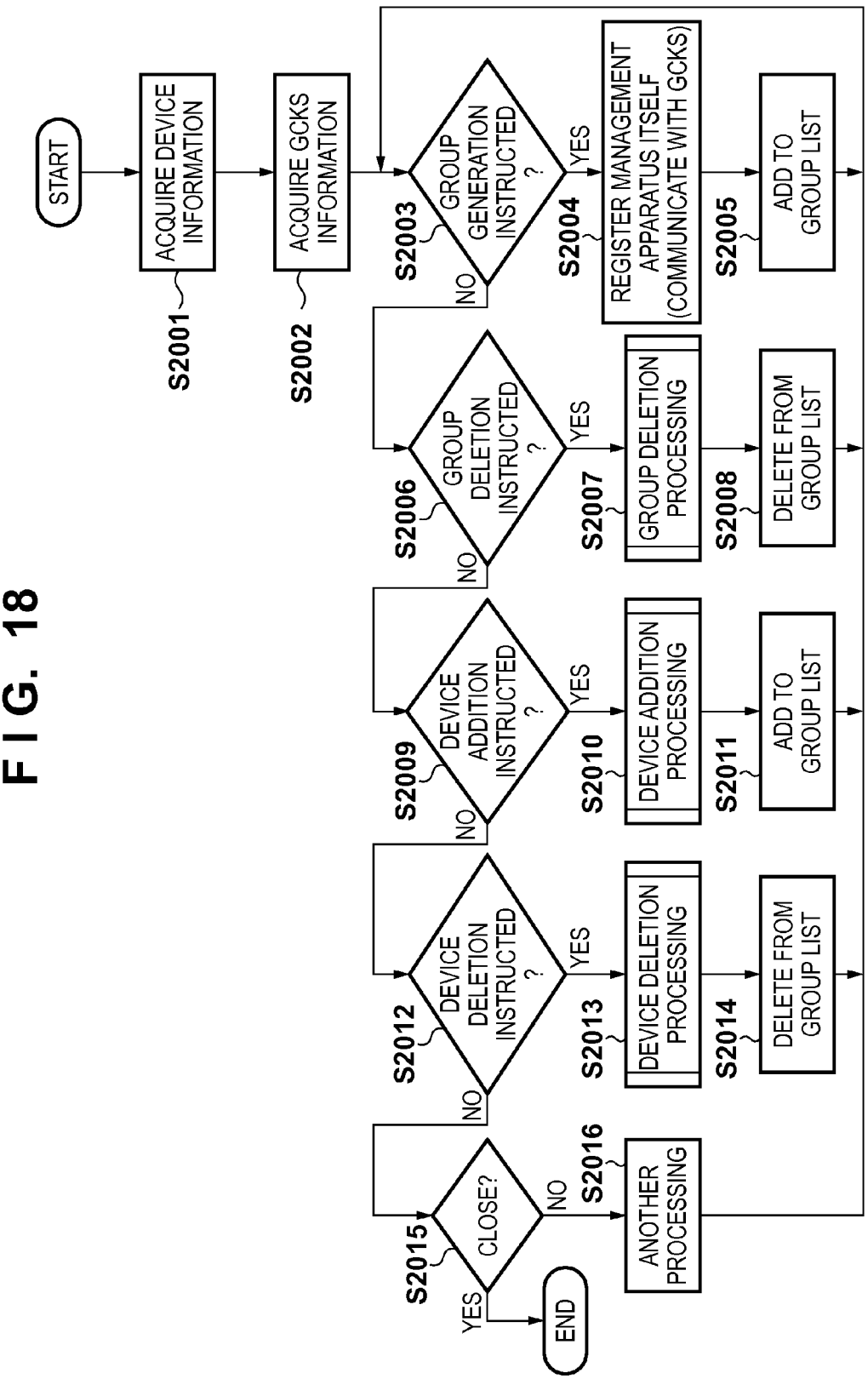
FIG. 18 is a flowchart according to the first embodiment.

FIG. 18 is a flowchart for carrying out the present invention, and illustrates a procedure of associating a device group with a multicast group. Note that if there is no particular mention of the subject in the explanation of the program operation, the CPU 201 of the device management apparatus 101 that executes the program is the subject.

Before the screen shown in FIG. 7 which causes the user to edit a device group is opened, the device management apparatus 101 forms the device list in FIG. 4 by the device search function 515 in FIG. 3A or the like (step S2001). The device management apparatus 101 searches for the GCKS 103 before the screen shown in FIG. 7 which causes the user to edit a device group is opened. Alternatively, the device management apparatus 101 acquires the address of the GCKS 103 or the like based on information set in the setting information 526 in advance (step S2002). After that, the device management apparatus 101 displays the screen in FIG. 7 on the display device 205 and waits for a user input via the input device 204.

In step S2003, the device management apparatus 101 determines whether group generation has been instructed by pressing the group generation button 903 in FIG. 7 and the generation button 1003 in FIG. 8. If group generation has been instructed (YES in step S2003), the device management apparatus 101 registers itself in the GCKS 103 (step S2004). The device management apparatus 101 adds the group to the group list. Otherwise (NO in step S2003), the process advances to step S2006.

When registering the device management apparatus 101 itself in the GCKS 103, the device management apparatus 101 acquires the group ID 701 from the group table 522 shown in FIG. 5 based on the parent group name 1001 and the group name 1002 input by the user. Similarly, the device management apparatus 101 acquires the multicast address 1202 from the table shown in FIG. 10. When the GCKS 103 permits registration of the device management apparatus 101, the device management apparatus 101 stores the group key issued by the GCKS 103 in correspondence with the group ID 1201 of the table shown in FIG. 10. At this time, the GCKS 103 registers the generated group key in the multicast group management information 1721 as the device identification information of the device management apparatus 101 in correspondence with the multicast address. When the processing of step S2004 has succeeded, the device management apparatus 101 adds the group to the group table 522 shown in FIG. 5 in step S2005. The added group is displayed in the group selection list 902 on the screen shown in FIG. 7.

In step S2006, the device management apparatus 101 determines whether the group deletion button 904 in FIG. 7 has been pressed. If the group deletion button 904 has been pressed (YES in step S2006), in step S2007, the device management apparatus 101 performs group deletion processing for the group selected in the group selection list 902. Otherwise (NO in step S2006), the process advances to step S2009.

When the group deletion processing (step S2007) has succeeded, the device management apparatus 101 deletes the target group from the group information shown in FIGS. 5 and 6 (step S2008). The group is deleted from the display of the group selection list 902 in FIG. 7 as well.

In step S2009, the device management apparatus 101 determines whether the device addition button 906 in FIG. 7 and the addition button 1102 in FIG. 9 have been pressed. If the addition button 1102 has been pressed (YES in step S2009), in step S2010, the device management apparatus 101 performs processing of adding the device selected in the device list 1101 shown in FIG. 9. If the addition button 1102 has not been pressed (NO in step S2009), the process advances to step S2012. When the addition deletion processing in step S2010 has succeeded, the device management apparatus 101 makes the group ID 801 in FIG. 6 correspond to the device ID 802 in step S2011 to add the device to the device group. In addition, the device management apparatus 101 adds the display to the device selection list 905 in FIG. 7.

If the device deletion button 907 in FIG. 7 has been pressed in step S2012 (YES in step S2012), the device management apparatus 101 performs device deletion processing in step S2013. Otherwise (NO in step S2012), the process advances to step S2015. When the device deletion processing in step S2013 has succeeded, the device management apparatus 101 deletes the correspondence between the group ID and the device ID in FIG. 6 in step S2014, and also deletes the display in the device selection list 905 in FIG. 7.

In step S2015, the device management apparatus 101 determines whether the close button in FIG. 7 (a button provided in a standard window, although not illustrated in FIG. 7) has been pressed. If the close button has been pressed (YES in step S2015), the window shown in FIG. 7 is closed, and the processing of the flowchart ends. If the close button has not been pressed (NO in step S2015), the process advances to step S2016 so that the device management apparatus 101 executes another processing (for example, device group selection change) concerning the window shown in FIG. 7.

(Group Deletion Processing)

Figure 19:
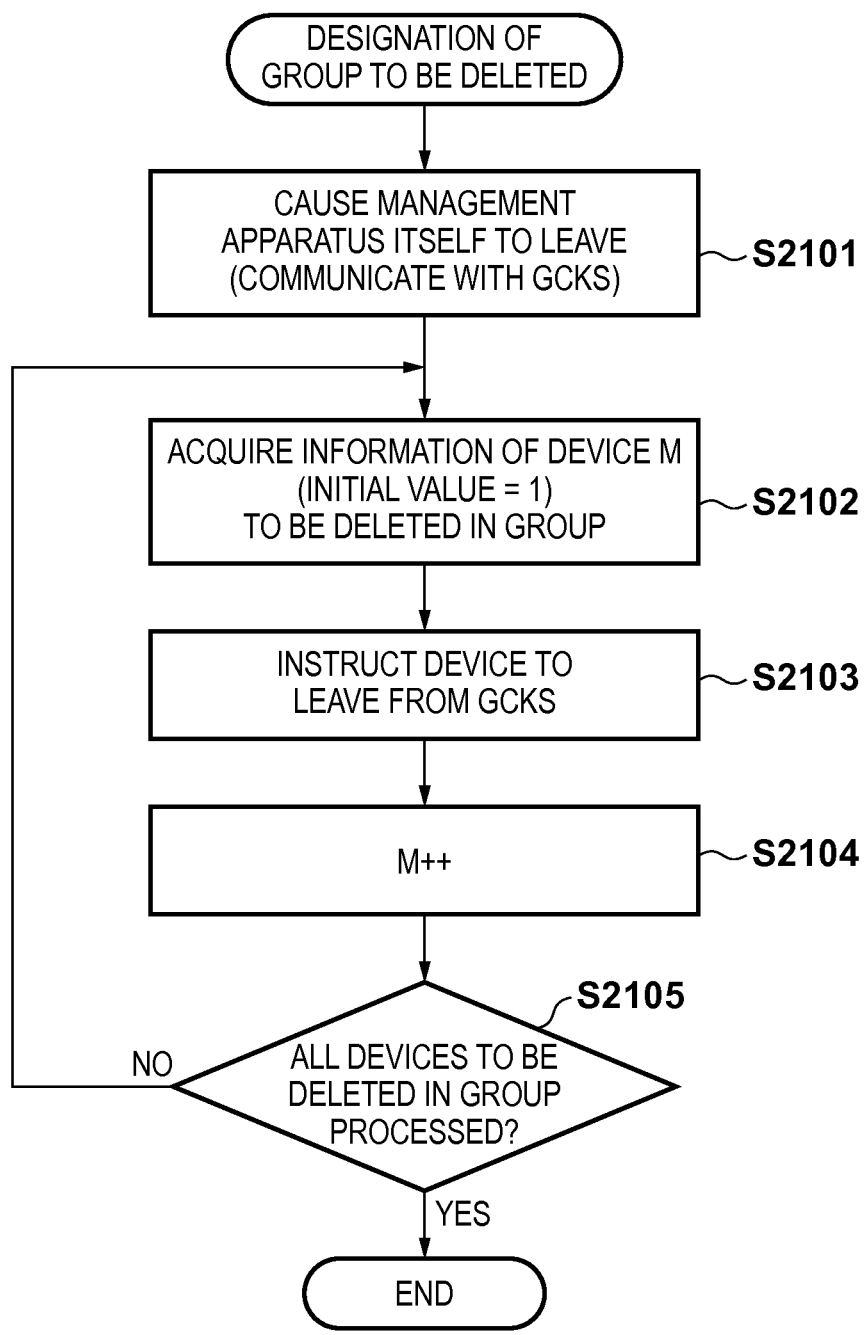
FIG. 19 is a subflowchart of group deletion processing.

The group deletion processing of step S2007 in FIG. 18 will be explained with reference to FIG. 19. The device management apparatus 101 sends a leave request to the GCKS 103 (step S2101). If authentication in the GCKS 103 has succeeded, the association between the multicast address and the device management apparatus 101 is deleted for the information shown in FIG. 17. In step S2102, the device management apparatus 101 acquires information about the device 102 associated with the group ID. When executing step S2102 for the first time, a counter M used to sequentially acquire the information of the device 102 associated with the group ID is initialized to 1.

In step S2103, the device management apparatus 101 instructs the device 102 to leave the GCKS 103. In step S2104, the device management apparatus 101 increments the value of the internal counter M by one to acquire the information of another device 102 associated with the group ID. If no device 102 to be processed remains in step S2105 (YES in step S2105), the processing procedure ends. Otherwise (NO in step S2105), the process returns to step S2102, and the device management apparatus 101 acquires information of the next device 102 (identified by the counter M) associated with the group ID, and executes processing from step S2103.

Upon receiving the leave instruction in step S2103, the device 102 sends a leave request to the GCKS 103. The GCKS 103 sends a leave permission to the device 102, and deletes the information of the device 102 concerning the multicast address from the information shown in FIG. 17. In this processing, every time the device management apparatus 101 or the device 102 is deleted from the multicast group, a new group key corresponding to the multicast address is generated in the GCKS 103. The generated group key is distributed to the remaining devices 102 belonging to the multicast address.

(Device Addition Processing)

The device addition processing of step S2010 in FIG. 18 will be explained with reference to FIG. 20. When the addition button 1102 shown in FIG. 9 has been pressed, the device management apparatus 101 starts processing of adding one or a plurality of devices 102 selected in the device list 1101 to the group selected in the group selection list 902 in FIG. 7.

When executing step S2201 for the first time, the device management apparatus 101 initializes the value of the counter M used to acquire the information of the device selected in the device list 1101 to 1, and acquires one piece of information of the Mth target device. In step S2202, the device management apparatus 101 instructs the Mth target device 102 to register in the GCKS 103. At this time, the device 102 performs registration in the GCKS 103. The GCKS 103 sends a registration permission, and adds the information of the device 102 to the list shown in FIG. 17. The device 102 that has received the registration permission from the GCKS 103 receives a group key from the GCKS 103 and stores it in the list shown in FIG. 14. In step S2203, the device management apparatus 101 increments the value of the counter M by one. In step S2204, it is confirmed whether the processing has ended for all target devices. If the processing has ended for the target devices (YES in step S2204), the processing of the flowchart ends. Otherwise (NO in step S2204), the process returns to step S2201 to continue the processing for the remaining devices.

(Device Deletion Processing)

Figure 21:
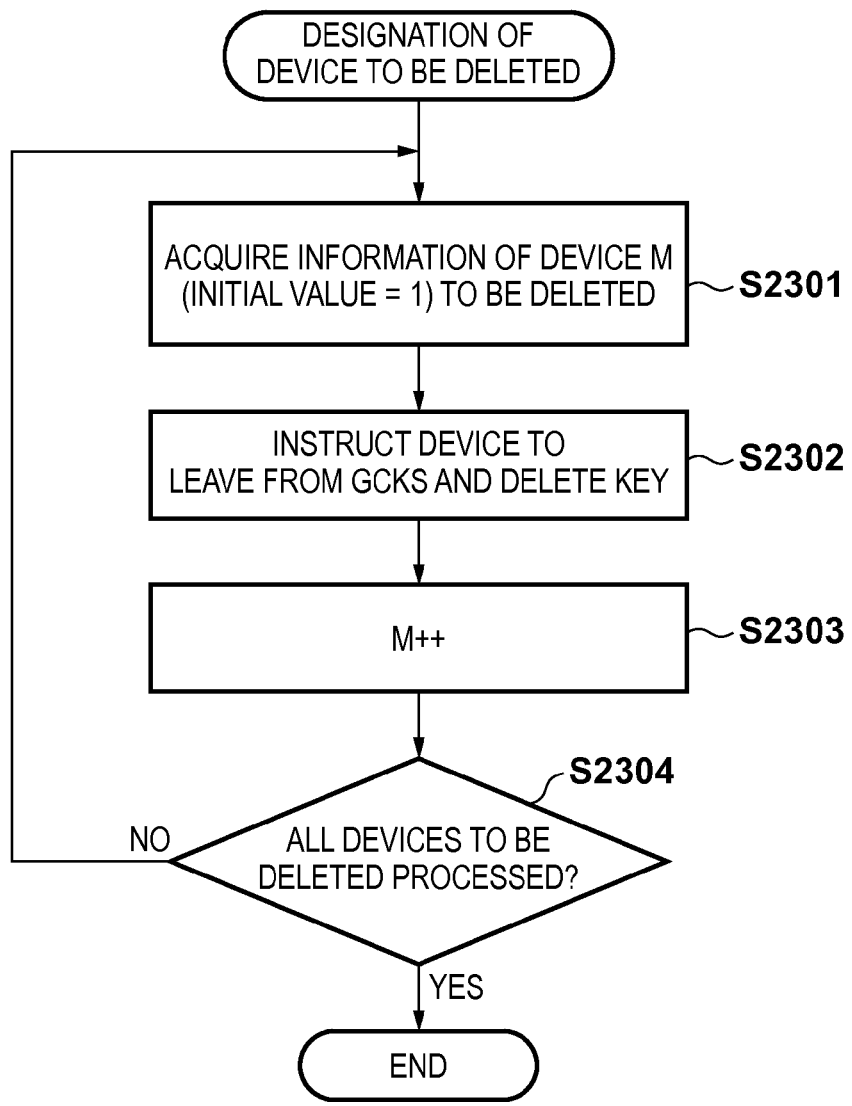
FIG. 21 is a subflowchart of device deletion processing.

The device deletion processing of step S2013 in FIG. 18 will be explained with reference to FIG. 21. When the device deletion button 907 shown in FIG. 7 has been pressed, the device management apparatus 101 starts processing of deleting one or a plurality of devices 102 selected in the device selection list 905 shown in FIG. 7.

When executing step S2301 for the first time, the device management apparatus 101 initializes the value of the counter M to 1, and acquires the information of the Mth device 102 to be deleted. In step S2302, the device management apparatus 101 instructs the device 102 to delete from the GCKS 103. At this time, the device 102 leaves from the GCKS 103. The GCKS 103 sends a leave permission, and deletes the information of the device 102 from the list shown in FIG. 17. The GCKS 103 also distributes an updated group key to the devices other than the device 102 to be deleted. The device 102 deletes the information of the associated multicast group from the list shown in FIG. 14.

In step S2303, the device management apparatus 101 increments the value of the counter M by one. In step S2304, the device management apparatus 101 determines whether the processing has ended for all the devices 102. If the processing has ended (YES in step S2304), the processing of the flowchart ends. Otherwise (NO in step S2304), the process returns to step S2301.

As described above, the device management apparatus can perform communication with the devices by multicast without making the user conscious of it while appropriately maintaining security only by selecting a device group for each device management function to be executed.

<Second Embodiment>

In the first embodiment, a group and a device are associated in the screen shown in FIG. 7, and a group is selected in the screen shown in FIG. 11 when executing a function. In the second embodiment, a function is selected, and a device is assigned using a screen shown in FIG. 22 in place of the screens in FIGS. 7 and 11. This embodiment will be described regarding points different from the first embodiment using the screen shown in FIG. 22 and the flowchart shown in FIG. 23.

Figure 22:
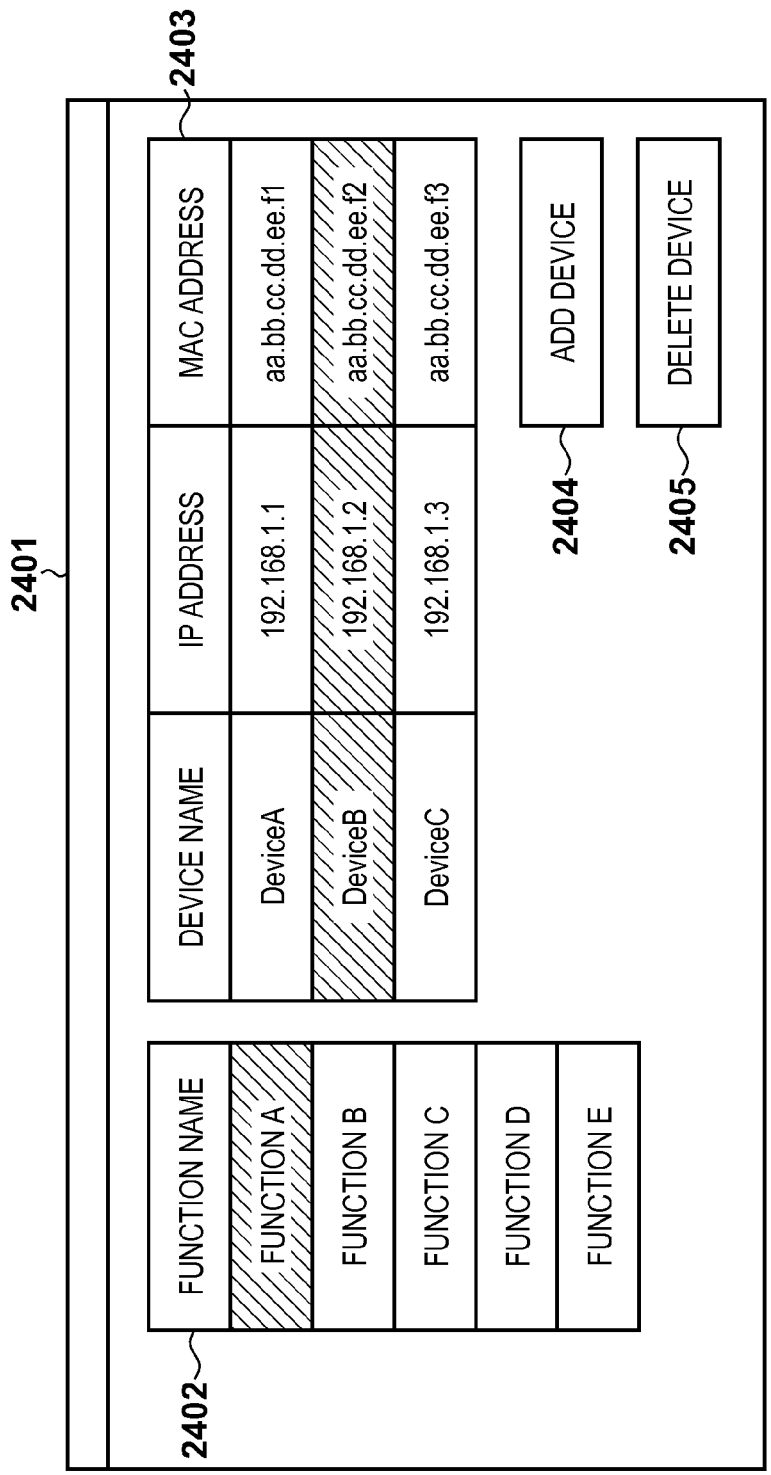
FIG. 22 is a view showing an example of a screen used to assign a device to a function according to the second embodiment.
Figure 23:
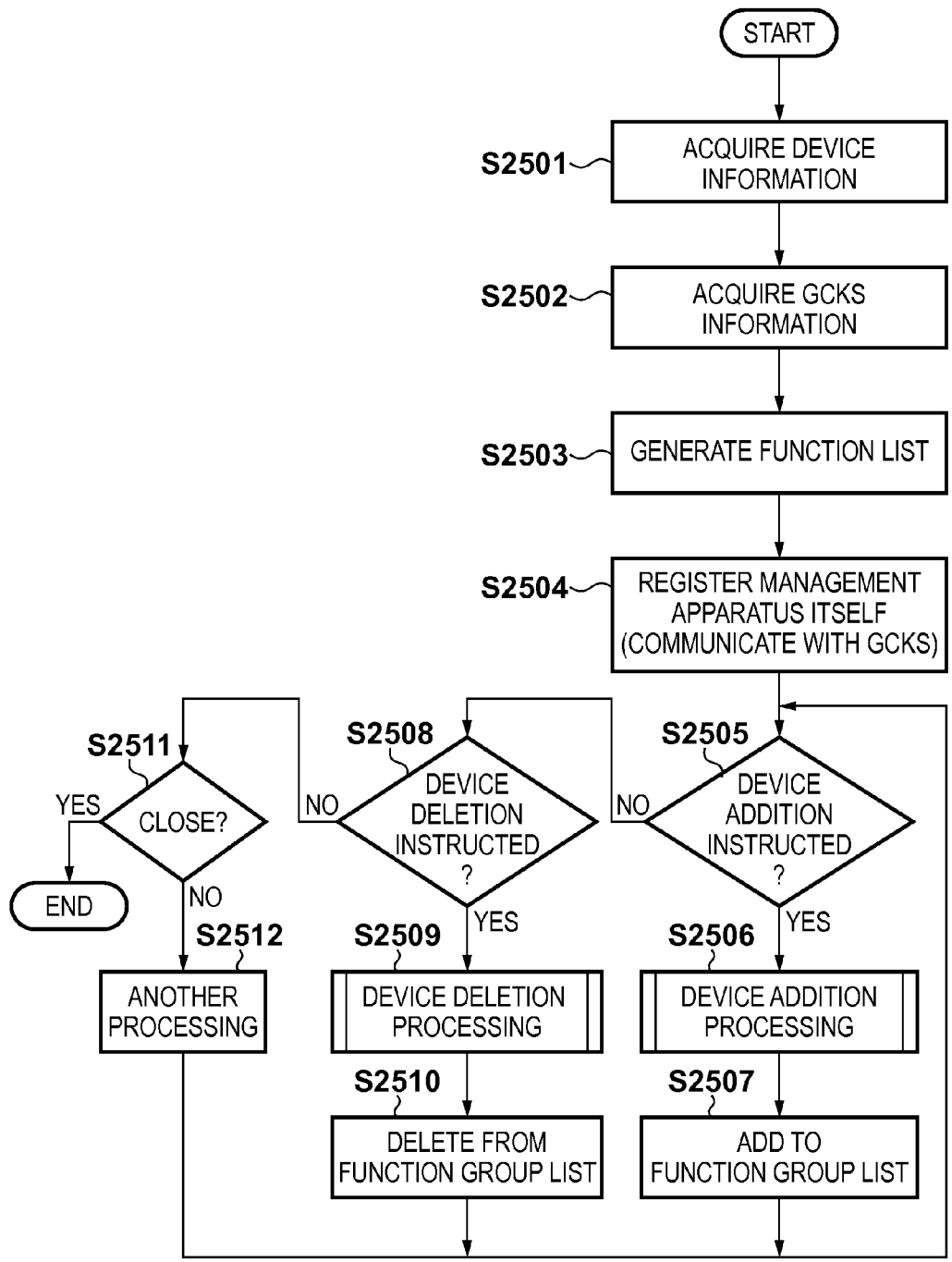
FIG. 23 is a flowchart according to the second embodiment.

When the screen shown in FIG. 22 is displayed, a device management apparatus 101 acquires device information from a device 102 using a device search function 515, and displays it in a device list 2403 in step S2501. In step S2502, the device management apparatus 101 acquires GCKS information. In step S2503, the device management apparatus 101 generates a list of the functions of the device management apparatus 101, and displays it as a function list 2402. In step S2504, the device management apparatus 101 manages, in it, a device group corresponding to each function in correspondence with each other. In addition, the device management apparatus 101 executes, for a GCKS 103, processing of causing the device management apparatus 101 itself to join a multicast group.

When a device addition button 2404 has been pressed in the screen shown in FIG. 22 (YES in step S2505), in step S2506, the device management apparatus 101 performs processing of adding the device selected in the device list 2403. This processing is the same as that described with reference to FIG. 20. In step S2507, the device management apparatus 101 adds the device information to correspondence tables shown in FIGS. 6 and 12. After that, the process returns to step S2505.

When a device deletion button 2405 has been pressed in the screen shown in FIG. 22 (YES in step S2508), in step S2509, the device management apparatus 101 deletes the device 102 selected in the device list 2403. This processing is the same as that described with reference to FIG. 21. In step S2510, the device management apparatus 101 deletes the device information from the correspondence tables shown in FIGS. 6 and 12. After that, the process returns to step S2505.

If neither the device addition button 2404 nor the device deletion button 2405 has been pressed (NO in steps S2505 and S2508), the device management apparatus 101 determines in step S2511 whether an instruction to close the window shown in FIG. 22 has been received. Upon receiving the close instruction (YES in step S2511), the device management apparatus 101 closes the window shown in FIG. 22, and ends the processing of the flowchart. If no instruction has been input (NO in step S2511), in step S2512, the device management apparatus 101 executes another processing concerning the window shown in FIG. 22, and the process returns to step S2505.

When executing a device management function, the device management apparatus 101 performs processing for each device belonging to a group assigned to the function of a function group correspondence table 527 shown in FIG. 12, which is generated in accordance with the above-described procedure.

As described above, according to this embodiment, when implementing a device management function, it is possible to execute processing of a target device by multicast communication.

<Third Embodiment>

In the third embodiment, a device management apparatus 101 includes a unit that determines for each device management function whether to use multicast IPsec. The device management apparatus 101 includes a unit for enabling SNMPv1 for a device 102, unlike the first and second embodiments. This will be described below in detail with reference to FIGS. 24A to 26.

FIG. 24A illustrates a screen including an interface 2601 used to cause the user to select, for each function, whether to enable or disable multicast IPsec, unlike the screen shown in FIG. 11. FIG. 24B illustrates a screen including an interface 2602 used to cause the user to select, for each function, whether to enable or disable multicast IPsec, unlike the screen shown in FIG. 22. FIG. 25 illustrates a function group correspondence table having, for each function, information representing whether multicast IPsec is enabled or disabled, unlike the function group correspondence table shown in FIG. 12. When the user selects enabling or disabling the multicast IPsec by the interface 2601 in FIG. 24A or the interface 2602 in FIG. 24B, the setting is written in information 2701 shown in FIG. 25 which represents whether the multicast IPsec is enabled or disabled.

Figure 20:
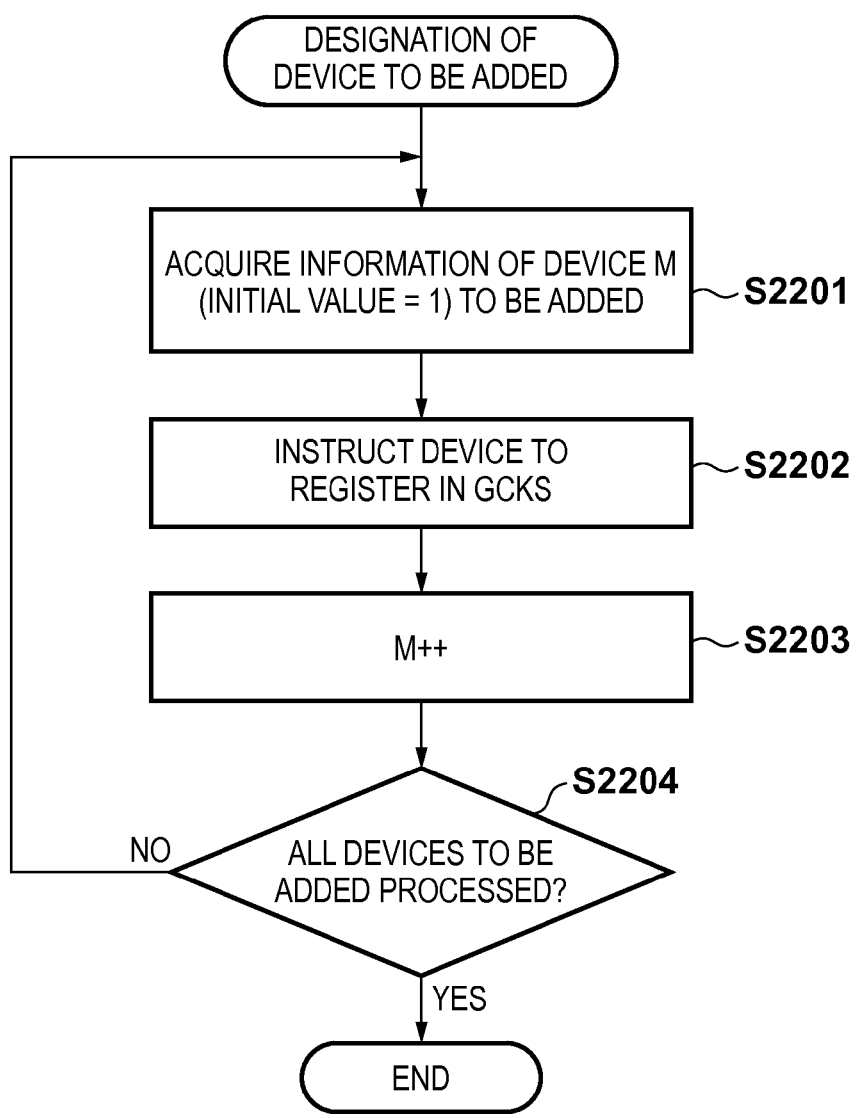
FIG. 20 is a subflowchart of device addition processing.
Figure 26:
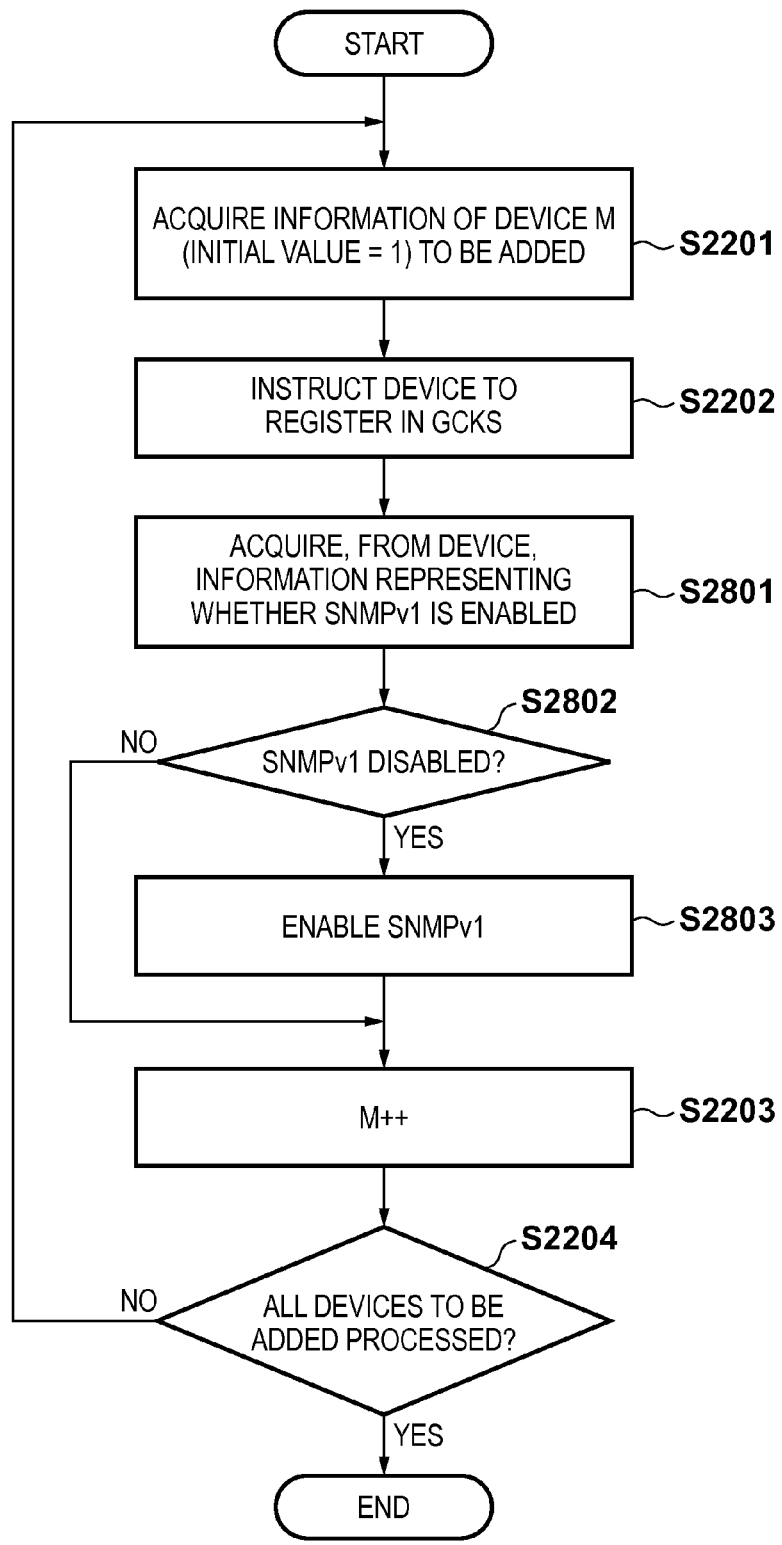
FIG. 26 is a flowchart when executing a device management function according to the third embodiment.

In this embodiment, processing shown in the flowchart of FIG. 26 is added between steps S2202 and S2203 of the device addition processing in FIG. 20. The processing shown in FIG. 26 will be described below. Note that a description of the same portions as in the second embodiment will be omitted.

The device management apparatus 101 instructs the device 102 to register in a GCKS 103 in step S2202, and acquires, from the device 102, information representing whether the SNMPv1 is disabled in step S2801. In step S2802, the device management apparatus 101 determines whether the SNMPv1 is disabled. If the SNMPv1 is enabled (NO in step S2802), the process advances to step S2203. If the SNMPv1 is disabled (YES in step S2802), the device management apparatus 101 performs, for the device 102, processing of enabling the SNMPv1. Note that acquisition or change of the SNMPv1 state can be executed using an arbitrary protocol such as a web service.

When executing a device management function, the device management apparatus 101 acquires, from the correspondence table shown in FIG. 25, information representing whether the multicast IPsec is enabled for the device management function to be executed. The device management apparatus 101 executes the management function by the multicast IPsec or another method in accordance with the acquired information. This embodiment assumes that when executing the device management function by the multicast IPsec, the SNMPv1 is used on the multicast IPsec. However, any protocol other than the SNMPv1 is also usable as long as it is a protocol that allows to communicate with a plurality of devices.

Note that the program shown in FIG. 3A is assumed to include functions corresponding to the steps described above as the embodiment, although not illustrated. In the device 102, the program shown in FIG. 13A is assumed to include functions of responding to the functions of the device management apparatus 101. In the device management apparatus 101, the data area shown in FIG. 3B is assumed to have an area to store a changed set value.

In the multicast IPsec, whether to apply the multicast IPsec can be controlled only by the IP address and the port number. For this reason, if a protocol (SNMP or the like) of the same port number is used for all functions on the multicast IPsec, communication is performed while always enabling the security. For example, when searching for a device for which the multicast IPsec is disabled by default, the search is performed while disabling the multicast IPsec. After a device is detected, the multicast IPsec of the device is enabled, and communication is then performed. In this case, if a protocol such as SNMP of the same port number is always used, the enable state and the disable state of the multicast IPsec cannot be switched. However, according to this embodiment, the enable state and the disable state of security are switched for each function even for the same port number. This allows the above-described utilization.

<Fourth Embodiment>

In the fourth embodiment, when communicating with a device 102, a device management apparatus 101 acquires information 2901 shown in FIG. 27 which represents whether multicast IPsec is possible, unlike the above-described embodiments. If the multicast IPsec is impossible in the target device 102, processing of a device management function is performed not by the multicast IPsec but by unicast for each device.

FIG. 27 shows information of each device accompanying a device table 521 shown in FIG. 4 provided in the device management apparatus 101. As accompanying information, the information 2901 representing whether the multicast IPsec is possible, information 2902 representing whether hard IPsec is possible, information 2903 representing whether soft IPsec is possible, and information 2904 representing whether SNMPv3 is possible are provided for each device 102. The device management apparatus 101 can acquire the information shown in FIG. 27 from the device 102 by a device search function 515 shown in FIG. 5.

Soft IPsec is a method of implementing IPsec communication by software. Hard IPsec is a method of implementing IPsec communication by hardware.

FIG. 28 shows a priority order table 3001 used to decide which communication method should have priority when a plurality of types of security communication are possible in FIG. 27. For example, assume that the larger the numerical value is, the higher the priority order is. In this case, the priority order rises in the order of SNMPv3>soft IPsec>hard IPsec. Note that the priority order is not limited to that described above.

Figure 29:
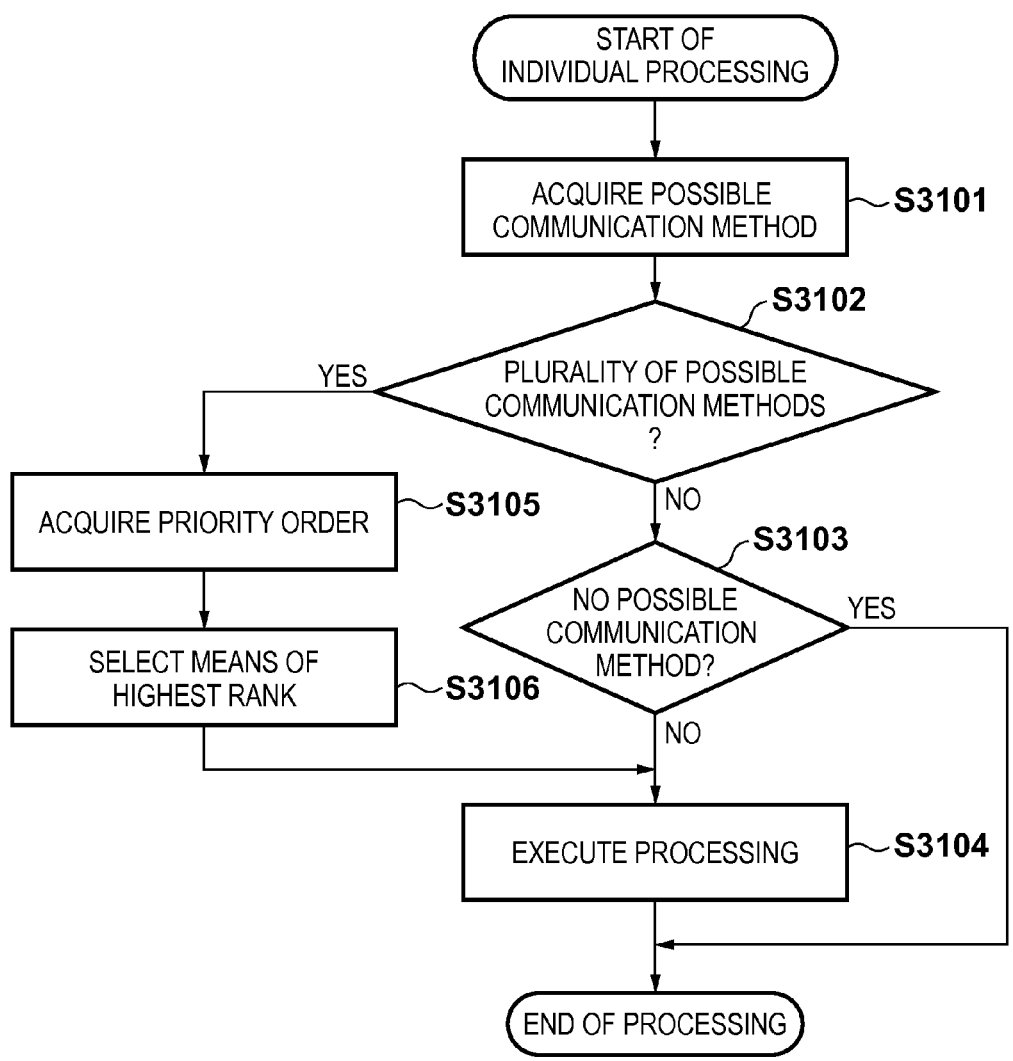
FIG. 29 is a flowchart according to the fourth embodiment.

FIG. 29 is a flowchart when the multicast IPsec is impossible in the device 102 that is the target of a device management function, and processing of the device management function is executed for each device. Processing according to this embodiment will be described with reference to the flowchart of FIG. 29.

In step S3101, the device management apparatus 101 acquires communication methods possible in the device 102 from the list shown in FIG. 27. In step S3102, the device management apparatus 101 determines whether a plurality of possible communication methods have been acquired. If a plurality of possible communication methods have been acquired (YES in step S3102), the process advances to step S3105. If a plurality of possible communication methods have not been acquired (NO in step S3102), the process advances to step S3103. In step S3103, the device management apparatus 101 determines whether no possible communication method has been acquired. If a possible communication method is absent (YES in step S3103), processing cannot be performed. Hence, the processing procedure ends without performing processing for each device.

If only one possible communication method has been acquired (NO in step S3103), the device management apparatus 101 executes a device management function, and executes processing for each device in step S3104.

In step S3105, the device management apparatus 101 looks up the priority order table 3001 shown in FIG. 28, and acquires the priority order of the communication method. In step S3106, the device management apparatus 101 selects the communication method having the highest priority. In step S3104, the device management apparatus 101 executes a device management function, and executes processing for each device.

According to this embodiment, processing with security can be performed even for a device that does not support the multicast IPsec. When a plurality of communication methods are provided, the priority order can be set. For this reason, for example, an IPsec function using hardware with a high processing speed can be used with priority over other method as a plurality of methods.

Note that in the above-described embodiments, the function of the GCKS 103 can also be implemented by the device management apparatus 101. In this case, the device management apparatus 101 has the software configuration of the GCKS 103. In the first and second embodiments, when the GCKS 103 is searched, and a plurality of GCKSs 103 are found, one GCKS 103 may be selected by, for example, causing the user to select a GCKS or employing a GCKS in the neighborhood.

Note that a plurality of group key management protocols such as GSAKMP (Group Secure Association Key Management Protocol), GDOI (Group Domain of Interpretation), and MIKEY (Multimedia Internet KEYing) are defined in the multicast IPsec. In addition, several methods such as LKH (Logical Key Hierarchy) have been proposed as group key management algorithms. In the present invention, any method can be employed if it is applicable.

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (for example, computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No.2011-237967, filed Oct. 28, 2011, which is hereby incorporated by reference herein in its entirety.

What is claimed is:

1. A management apparatus for managing one or a plurality of devices connected to a network, the apparatus comprising:
a CPU coupled to a memory and programmed to provide:
a management unit configured to manage information of each device,
an instruction unit configured to cause a server having a function of managing a key to:
implement multicast using an Internet Protocol Security (IPsec) protocol to register information of the management apparatus and information of a device, among devices managed by the management unit, caused to belong to a multicast group, and
issue key information to be used in the multicast group, and
a search unit configured to search for a device connected to the network; and
a communication interface configured to perform multicast communication using the IPsec protocol with the device belonging to the multicast group and the key information issued by the server,
wherein, when performing a search, the search unit does not perform multicast communication using the IPsec protocol.

2. The apparatus according to claim 1,
wherein the management unit manages information of a function of the device, and
wherein the instruction unit designates the multicast group to which a device belongs for each function of the device, and causes the server to issue the key information to be used in the multicast group for each function.

3. The apparatus according to claim 2, wherein the CPU is further programmed to provide a setting unit configured to set, for each multicast group to which a device belongs for each function of the device, the multicast communication using the IPsec protocol in one of: an enable state and a disable state.

4. The apparatus according to claim 1, wherein the instruction unit causes the server to update the key information to be used in the multicast group if a device belonging to the multicast group has changed.

5. A management apparatus for managing one or a plurality of devices connected to a network, the apparatus comprising:
a CPU coupled to a memory and programmed to provide:
a management unit configured to manage information of each device and information of a device group to which the device belongs,
an instruction unit configured to cause a server having a function of managing a key to:
designate a multicast group to which a device belongs for each device group,
implement multicast using an IPsec protocol to register information of the management apparatus and information of a device, among devices managed by the management unit, caused to belong to a multicast group, and
issue the key information to be used in the multicast group, and
a setting unit configured to set, for each device group to which a device belongs, the multicast communication using the IPsec protocol in one of: an enable state and a disable state; and
a communication interface configured to perform multicast communication using the IPsec protocol with the device belonging to the multicast group and the key information issued by the server.

6. The apparatus according to claim 5,
wherein the CPU is further programmed to provide a determination unit configured to determine whether the multicast communication using the IPsec protocol is enabled between the management apparatus and a device, and
wherein, if the determination unit determines that the multicast communication using the IPsec protocol is disabled, the communication interface communicates with each device using Simple Network Management Protocol Version 3 (SNMPv3).

7. A management method of a management apparatus for managing one or a plurality of devices connected to a network, the method comprising steps of:
managing information of each device;
causing a server having a function of managing a key to:
implement multicast using an IPsec protocol to register information of the management apparatus and information of a device, among managed devices, caused to belong to a multicast group, and
issue key information to be used in the multicast group;
performing multicast communication using the IPsec protocol with the device belonging to the multicast group and the key information issued by the server; and
searching for a device connected to the network,
wherein during the searching the multicast communication using the IPsec protocol is not performed.

8. A non-transitory computer-readable storage medium storing a program that when executed causes a computer to perform a management method of a management apparatus for managing one or a plurality of devices connected to a network, the method comprising steps of:

managing information of one or a plurality of devices connected to a network;

causing a server having a function of managing a key to:
    implement multicast using an IPsec protocol to register information of the computer and the information of a device, among managed devices, caused to belong to a multicast group, and
    issue key information to be used in the multicast group;

performing multicast communication using the IPsec protocol with the device belonging to the multicast group and the key information issued by the server; and searching for a device connected to the network, wherein during the searching the multicast communication using the IPsec protocol is not performed.

9. A management method of a management apparatus for managing one or a plurality of devices connected to a network, the method comprising steps of:

managing information of each device and information of a device group to which the device belongs;

causing a server having a function of managing a key to:
    designate a multicast group to which a device belongs for each device group,
    implement multicast using an IPsec protocol to register information of the management apparatus and the information of a device, among managed devices, caused to belong to a multicast group, and
    issue the key information to be used in the multicast group;

performing multicast communication using the IPsec protocol with the device belonging to the multicast group and the key information issued by the server; and setting, for each device group to which a device belongs, the multicast communication using the IPsec protocol in one of: an enable state and a disable state.

10. A non-transitory computer-readable storage medium storing a program that when executed causes a computer to perform a management method of a management apparatus for managing one or a plurality of devices connected to a network, the method comprising steps of:

managing information of each device and information of a device group to which the device belongs;

causing a server having a function of managing a key to:
    designate a multicast group to which a device belongs for each device group
    implement multicast using an IPsec protocol to register information of the computer and the information of a device, among managed devices, caused to belong to a multicast group, and
    issue the key information to be used in the multicast group;

performing multicast communication using the IPsec protocol with the device belonging to the multicast group and the key information issued by the server; and setting, for each device group to which a device belongs, the multicast communication using the IPsec protocol in one of: an enable state and a disable state.

* * * * *